UNITED STATES PATENT OFFICE 2,056,126

3-KETO-ACIDS OF THE SUGAR SERIES AND THEIR ANHYDRIDES AND PROCESS FOR THE MANUFACTURE OF THE SAME

Tadeus Reichstein, Zurich, Switzerland, assignor to Hoffmann-La Roche Inc., Nutley, N. J., a corporation of New Jersey No Drawing. Application March 27, 1934, Serial No. 717,684. In Switzerland April 10, 1933

13 Claims. (Cl. 260—123)

Representatives of 3-keto-acids of the sugar series have until lately been wholly unknown. Only a short time ago several investigators have proved (Zeitschrift für physiologische Chemie vol. 215, 1933, p. 215; Journal of the Society of Chemical Industry vol. 52, 1933, p. 221; Nature, vol. 131, 1933, p. 617) that the ascorbic acid, prepared by Szent-Györgyi (Biochemical Journal vol. 22, 1928, p. 1387) from different animal and vegetable substances and discovered by him to be the principal antiscorbutic factor (C-vitamin) (Nature vol. 130, 1932, p. 576), has the constitution of an anhydride of 3-keto-laevo-threo-hexonic-acid.

For the synthetic preparation of such compounds no methods have heretofore become known. It has now been found, that by treating osones, obtained by oxidation of sugars in the usual manner, with hydrocyanic acid or its salts products may be obtained, which by saponification are converted into 3-keto-acids of the next higher sugars or their anhydrides (lactones?). At which stage of the reaction the dehydration takes place, is still unknown and moreover without importance for the final result. As regards the position of the anhydro ring, the present state of our knowledge points to a γ-lactone ring (Nature vol. 131, 1933, p. 617; Journ. Vet. Akad. Arkiv f. Kemi, vol. 11, 1933, p. 14; Zeitschrift für physiologische Chemie vol. 218, 1933, p. 280; Helvetica Chimica Acta vol. 16, 1933, p. 1019). By analogy it is to be supposed that likewise all lower and higher homologues contain such a ring, in so far as they crystallize as anhydrides. Taking the lactone formula for granted, the synthesis for instance of ascorbic acid from laevo-xylosone would proceed according to the following formula:

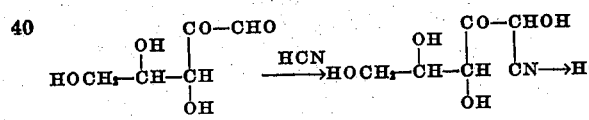

Whether in other cases likewise γ-lactones are formed, is as yet undecided. All these 3-keto-acid-anhydrides derived from sugars have in common a strong reducing capacity, which pertains to the common right-hand half of the molecule showing a keto-enol-tautomerism according to the following formula

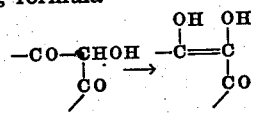

To the solid crystallized phase the endiol structure may be given.

The products decolorize 2,6-di-chloro-phenol-indo-phenol in neutral and acid solution, likewise acid iodine solution. From acid solutions of silver and gold salts the metal is separated; thus the products may be used as reagents for these precious metals.

Different methods may be employed for the treatment with hydrocyanic acid. The osone can for instance in aqueous, alcoholic or any other suitable solution be treated with an equivalent quantity of hydrocyanic acid or with an excess of the said acid for a considerable length of time either at ordinary or higher temperature. For shortening and completing the reaction catalysts, such as organic and inorganic bases, for instance potassium hydroxide, soda, potassium cyanide, sodium sulphite, ammonia, diethylamine, piperidine etc., may be added. The osone, likewise the hydrocyanic acid or both components may also be used in the form of salts or of decomposable addition compounds with other substances. So for instance the osone may be used direct as the lead salt, obtained by the method of Emil Fischer (Berichte der Deutschen Chemischen Gesellschaft, vol. 22, 1889, p. 87), or the osone can be mixed with a small excess of aqueous sodium bisulphite solution and to this solution an excess of potassium cyanide in water added. The transformation is then soon terminated.

The reaction product is best saponified with strong aqueous acids at room temperature; if heated, saponification sets in more quickly, but care should be taken not to heat above 100° C., since otherwise far-reaching decomposition occurs. As the substances thus obtained, and likewise the hydrocyanic acid addition compounds,

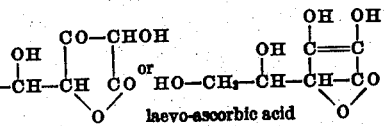

are very easily oxidized, they must be carefully protected from air and other oxidizing agents during preparation.

Example 1

100 grams of crude d-xylosone are dissolved in 1500 grams of 3% aqueous hydrocyanic acid, 10 grams of strong ammonia are added and after having driven off the air with carbon monoxide the product is left to stand for 24 hours at room temperature. After acidifying with hydrochloric acid and evaporation in vacuo the residue is dissolved in 600 grams of 7.5% hydrochloric acid and heated in a carbon dioxide atmosphere for 1 or 2 days at 50° C. The product is then evaporated to dryness in vacuo and the residue taken up with strong alcohol, which leaves ammonium-chloride and other inorganic substances (from the crude xylosone) behind in undissolved condition. Further impurities may be removed by the addition of ether free from peroxide. The filtered, clear solution shows all reactions of ascorbic acid, but rotates the plane of polarization to the left. To purify the product it is concentrated and fractionally precipitated with lead acetate. At first some impurities are precipitated, later the d-ascorbic acid in the form of its lead salt. The separated lead salt is washed with alcohol and decomposed by hydrogen sulphide. The acid thus obtained (30 to 50 grams according to the purity of the xylosone employed) may be recrystallized from ½ part of hot water or from alcohol. The crystals show the composition $C_6H_8O_6$, they melt at 189° C. with decomposition and have all the properties of natural ascorbic acid, only the optical rotation is reversed, namely $-49°$ ($c=1$ in methanol). Biologically the product is also less active than the laevo-form. The acetone compound can also be used for purification; it is obtained in the usual manner (Nature vol. 130, 1932, p. 847), on being heated with water it splits off acetone and after evaporation to dryness leaves the pure acid behind.

Example 2

100 grams of laevo-xylosone are dissolved in 5 liters of distilled water, the air driven off with nitrogen, a solution of 60 grams of potassium cyanide in 1 liter of air-free water is added and the mixture left to stand at about 15° C. for fifteen minutes. Hereafter strong hydrochloric acid is added until the reaction is acid to congo-paper (about 110 ccm of concentrated hydrochloric acid), the product evaporated in vacuo at 40° C. bath temperature to a volume of 300 ccm, the residue washed with water saturated with carbon dioxide into a glass flask of 1 liter contents. Thus a total quantity of 800 ccm liquid is obtained, 200 ccm of concentrated hydrochloric acid are mixed therewith, the air driven off with carbon dioxide and the well-stopped flask heated for 24-30 hours to 48-50° C.

The solution is filtered to remove small quantities of dark-coloured impurities and then evaporated to dryness in vacuo at 35-40° C. The residue is extracted with absolute alcohol, the inorganic salts filtered off and washed with alcohol. A total quantity of 1 liter solution is obtained. The salts have become inactive. From the alcoholic solution further impurities may be removed by the addition of ether free from peroxide. The first time part of the active substance is always likewise precipitated, so that the precipitate must be dissolved in alcohol and the precipitation repeated. By evaporating the filtered solutions in vacuo a syrup is obtained which after seeding with ascorbic acid immediately, or after some standing begins to crystallize. Crystallization may be accelerated by repeated stirring, finally the product is left to stand for some hours at 0° C., the liquid removed by suction, first washed with absolute alcohol, then with butyl alcohol and evaporated in vacuo. From the mother liquor further quantities may be obtained by diluting with some alcohol and adding alcoholic lead acetate until there is no more precipitate. The precipitated light yellow lead salt is removed by centrifuge, washed with alcohol, suspended in distilled water, decomposed with hydrogen sulphide, the solution filtered from the precipitated lead sulphide and evaporated in vacuo at 40° C. to a syrup. From this syrup a second crystallization is obtained in the same manner as just described. The total yield is about 40 grams according to the quality of the laevo-xylosone. If the product is not quite pure, it may be recrystallized for instance from ½ part of water. The colourless crystalline leaflets thus obtained possess the same properties as natural ascorbic acid, a melting point of 189° C. (dec.), $$[\alpha]_D^{20} = +49°$$ ($c=1$ in methanol). A direct comparison of the acid and some derivatives proved absolute identity, and finally biological experiments with guinea pigs showed that it was fully active C-vitamin.

Example 3

100 grams of d-glucosone are dissolved in 8 liters of air-free water, a solution of 50 grams of sodium cyanide in 2 liters of air-free water is added and the product left to stand in a carbon monoxide atmosphere at room temperature for half an hour. It is then slightly acidified with sulphuric acid, until the reaction to congo-paper is faintly acid, and evaporated in vacuo to a volume of 1 liter. After addition of 200 ccm of concentrated hydrochloric acid the reaction product is heated at 48-50° C. for 30 hours, 100 grams of barium carbonate are added while stirring to neutralize the acid. When the transformation is terminated the product is filtered and the clear solution evaporated to dryness in vacuo at as low temperature as possible. The residue is extracted with anhydrous ethanol, until only inorganic salts are left, and the solution freed from further impurities by the addition of a large volume of peroxide-free ether. After evaporation, finally in vacuo, the 3-keto-d-arabino-heptonic-acid-lactone is mostly immediately obtained in crystalline form. For purification the product may be recrystallized from ½ part of water. The pure white crystals contain one molecule of water of crystallization, which is easily removed by heating in vacuo. The crystals melt at about 96° C. with development of gas. Slightly above 100° crystallization usually occurs again. The anhydrous compound $C_7H_{10}O_7$ then melts at 190° with decomposition. The optical rotation is $$[\alpha]_D^{14.5} = -16.8°$$

($c=1.8$ in n/100 aqueous hydrochloric acid) for the anhydrous compound. The yield is 5-70 grams.

Example 4

10 grams of laevo-arabinosone are dissolved in 1 liter of water containing 7.5 grams of sodium bisulphite and being free from oxygen. A solution of 12 grams of potassium cyanide in a little water is added. The transformation is, as shown by titration, terminated after 10 minutes. The saponification and further treatment are the same as described in Examples 1 and 3; it is advantageous finally to fractionally precipitate the alcoholic solution with lead acetate and decompose the active fractions with hydrogen sulphide. To purify the product it is recrystallized from ½ part of hot water. The yield is about 2 grams.

The crystals have the composition $C_6H_8O_6$, they are therefore anhydrous, their melting point lies at 169° C., the optical rotation $$[\alpha]_D^{16.5} = +21.5°$$

(c=0.93 in methanol) or +17° (c=1.82 in n/100 aqueous hydrochloric acid). The product may be designated as laevo-erythro-3-keto-hexonic-acid-lactone.

Example 5

From 10 grams of d-galactosone about 4–6 grams of d-lyxo-3-keto-heptonic-acid-lactone may be obtained in a similar manner. After recrystallization from ½ part of water beautiful crystals of the formula $C_7H_{12}O_8$ are obtained. They retain one molecule of water of crystallization which is removed with difficulty. The hydrated substance melts at about 94° C. with evolution of vapor and slow decomposition. The anhydrous product melts at 134–135° C.

$$[\alpha]_D^{14.5} = -5.8°$$

(c=2.17 in n/100 aqueous hydrochloric acid) for the anhydrous compound.

The terms used throughout this case are formulated in accordance with the conventional abbreviations used in sugar chemistry, in such a manner as to avoid too complicated a nomenclature.

The term "hexonic acids" is an abbreviation for all 2, 3, 4, 5, 6-penta-hydroxy-capronic acids, that is, gluconic acid, galatonic acid, etc. Hexonic acids are described in Richter's Organic Chemistry, vol. I, second edition, at page 641. The term "heptonic acid" is an abbreviation for all 2, 3, 4, 5, 6, 7-hexa-hydroxy-heptylic acids, that is, gluco-heptonic acid, galacto heptonic acid, etc. Heptonic acids are described in Richter's textbook at page 651.

The term "3-keto-hexonic acid" is therefore an abbreviation for all 2, 4, 5, 6-tetra-hydroxy-3-keto capronic acids. The prefixes "laevo", "dextro", "threo", "arabino", "erythro", "lyxo", etc. are necessary in this nomenclature to indicate the steric configuration. Ascorbic acid, for instance, is a 3-keto-hexonic acid-lactone and possesses two asymmetric carbon atoms in the 4 and 5 positions; the groups attached to these asymmetric carbon atoms bear the same configuration as the groups which are attached to the asymmetric carbon atoms in laevo-threose. The correct name for the compound is therefore "laevo-threo-3-keto-hexonic-acid-lactone".

In accordance with the same reasoning, the term "arabino-heptonic" means that the groups around the asymmetric carbon atoms of the heptonic acid have the same steric configuration as the groups attached to the asymmetric carbon atoms of arabinose.

I claim:

1. The process for the manufacture of lactones of 3-keto-acids of the sugar series, which consists in treating osones possessing the same steric configuration but one carbon atom less than the desired 3-keto-acid-lactone, with hydrocyanic acid and saponifying the products thus obtained.

2. The process for the manufacture of lactones of 3-keto-acids of the sugar series, which consists in treating osones possessing the same steric configuration but one carbon atom less than the desired 3-keto-acid-lactone, with water soluble salts of hydrocyanic acid and saponifying the products thus obtained.

3. The process for the manufacture of lactones of 3-keto-acids of the sugar series, which consists in treating osones possessing the same steric configuration but one carbon atom less than the desired 3-keto-acid-lactone, with hydrocyanic acid in the presence of small quantities of basic substances as catalysts.

4. The process for the manufacture of lactones of 3-keto-acids of the sugar series, which consists in treating osones possessing the same steric configuration but one carbon atom less than the desired 3-keto-acid-lactone, with water soluble salts of hydrocyanic acid in the presence of small quantities of basic substances as catalysts and saponifying the products thus obtained.

5. The process for the manufacture of laevo-ascorbic acid, which consists in treating laevo-xylosone with hydrocyanic acid and saponifying the compound thus obtained.

6. The process for the manufacture of laevo-ascorbic acid, which consists in treating compounds of laevo-xylosone which are easily hydrolyzable to laevo-xylosone with hydrocyanic acid and saponifying the compound thus obtained.

7. The process for the manufacture of laevo-ascorbic acid, which consists in treating laevo-xylosone with water soluble salts of hydrocyanic acid and saponifying the compound thus obtained.

8. The process for the manufacture of laevo-ascorbic acid, which consists in treating compounds of laevo-xylosone which are easily hydrolyzable to laevo-xylosone with water soluble salts of hydrocyanic acid and saponifying the compound thus obtained.

9. The process for the manufacture of laevo-ascorbic acid, which consists in treating laevo-xylosone with hydrocyanic acid in the presence of small quantities of basic substances as catalysts and saponifying the compound thus obtained.

10. The process for the manufacture of laevo-ascorbic acid, which consists in treating compounds of laevo-xylosone which are easily hydrolyzable to laevo-xylosone with hydrocyanic acid in the presence of small quantities of basic substances as catalysts and saponifying the compound thus obtained.

11. The process for the manufacture of laevo-ascorbic acid, which consists in treating laevo-xylosone with water soluble salts of hydrocyanic acid in the presence of small quantities of basic substances as catalysts and saponifying the compound thus obtained.

12. The process for the manufacture of laevo-ascorbic acid, which consists in treating compounds of laevo-xylosone which are easily hydrolyzable to laevo-xylosone with water soluble salts of hydrocyanic acid in the presence of small quantities of basic substances as catalysts and saponifying the compound thus obtained.

13. A 3-keto-acid lactone of the sugar series selected from the group consisting of 3-keto-dextro - arabino - heptonic - acid-lactone, laevo-erythro-3-keto-hexonic-acid-lactone and dextro-lyxo-3-keto-heptonic-acid-lactone.

TADEUS REICHSTEIN.